H. C. RASSMANN.
WATERING DEVICE FOR CATTLE.
APPLICATION FILED FEB. 12, 1917.
1,254,848.
Patented Jan. 29, 1918.
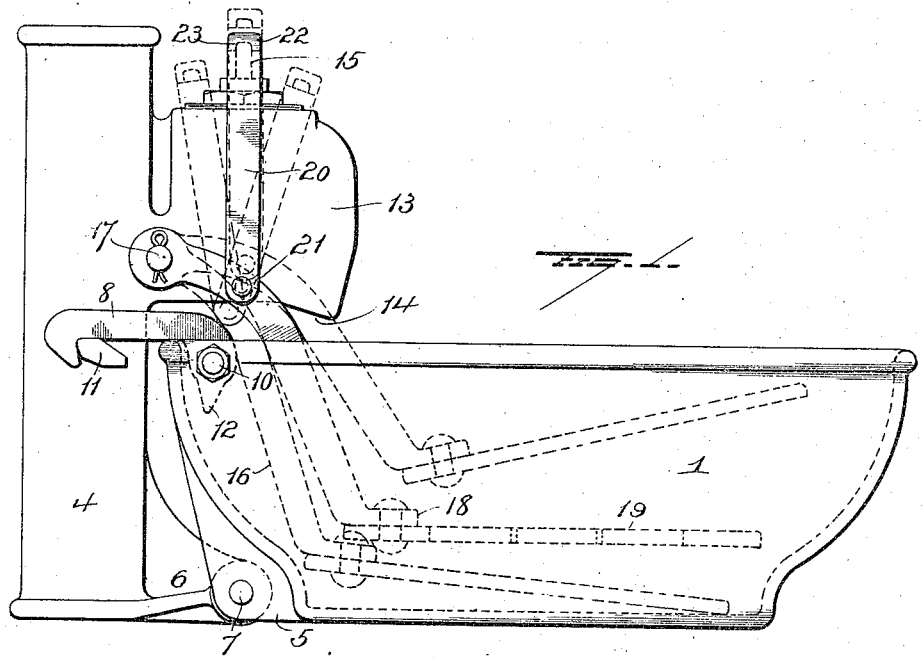
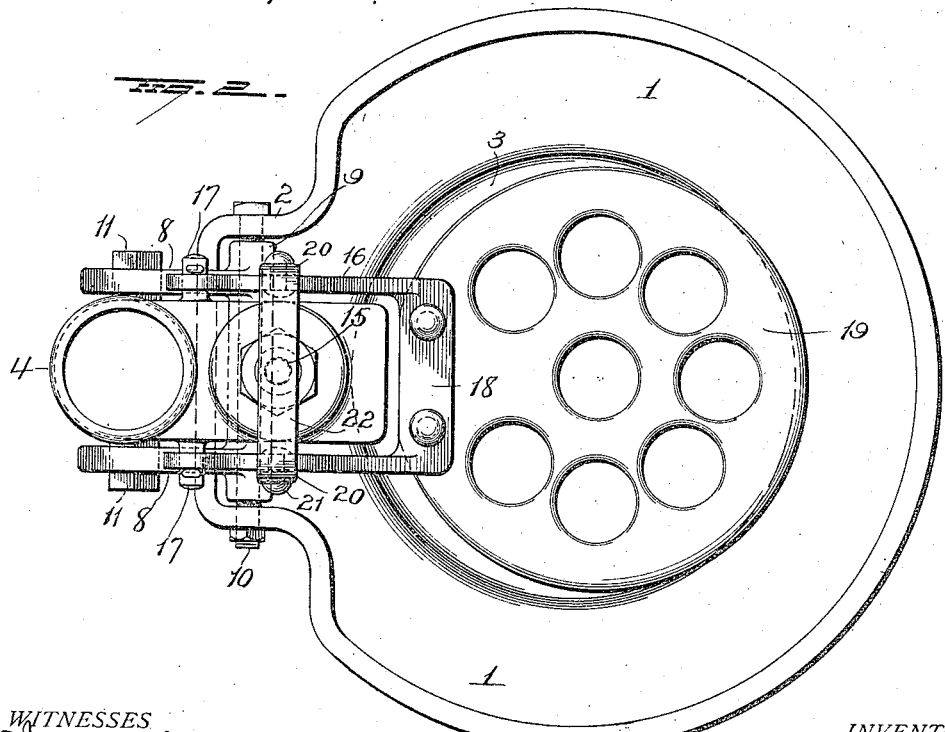
WITNESSES
E. Nottingham
G. F. Downing
INVENTOR
H. C. Rassmann
By Seymour & Bright
Attorneys

UNITED STATES PATENT OFFICE.

HUGO C. RASSMANN, OF BEAVER DAM, WISCONSIN.

WATERING DEVICE FOR CATTLE.

1,254,848.   Specification of Letters Patent.   Patented Jan. 29, 1918.

Application filed February 12, 1917. Serial No. 148,137.

*To all whom it may concern:*

Be it known that I, HUGO C. RASSMANN, a citizen of the United States, and a resident of Beaver Dam, in the county of Dodge and State of Wisconsin, have invented certain new and useful Improvements in Watering Devices for Cattle; and I do hereby declare the following to be a full, clear, and exact description of the invention, such as will enable others skilled in the art to which it appertains to make and use the same.

This invention relates to improvements in watering devices for cattle, and more particularly to that type in which the flow of water into the bowl is controlled by the cattle,—one object of the present invention being to simplify and improve the mechanism whereby the opening of the supply valve is controlled, so as to afford a maximum leverage.

A further object is to so construct a watering device embodying a drop bowl and cattle operated means for controlling the water supply, that the lever and the platform forming part of said mechanism and which is engaged by the cattle, may be permitted to descend with the bowl when the latter is dropped and thus be prevented from being broken off by the cattle.

A further object is to provide means in a watering device for cattle in which the water supply is controlled by the cattle, for rendering the valve controlling means inoperable by the animal.

A further object is to provide improved latch devices for normally holding the hinged bowl in horizontal position and for permitting said bowl to be dropped for cleaning purposes.

With these and other objects in view, the invention consists in certain novel features of construction and combinations of parts as hereinafter set forth and pointed out in the claims.

In the accompanying drawings; Figure 1 is a side elevation showing an embodiment of my invention, and Fig. 2 is a plan view of the same.

1 represents a drinking bowl for cattle and, in the present instance, is made approximately circular in form with an offset portion 2 and having a depressed bottom portion 3 to contain a comparatively small quantity of water to serve as a bait for the cattle. The bowl is pivotally connected to a water pipe or support 4,—for which purpose, the bowl and water pipe are provided, respectively, with lugs 5, 6, connected by a pivot pin 7, and the bowl is maintained in its normal horizontal position by means of latch arms 8, 8. These latch arms are connected so as to be movable simultaneously, and in the present instance the connecting member may consist of a tubular casting 9 made integral with the latch arms and mounted on a cross rod 10 disposed in the upper part of the offset portion 2 of the bowl, as clearly shown in Fig. 2. The latch arms engage lugs 11 projecting from opposite sides of the pipe or support 4, and these lugs may be beveled to facilitate the engagement of the hooked ends of the latch arms therewith. In order to prevent the latch arms from being raised too high to permit them to automatically engage the lugs when the bowl is raised to its normal horizontal position, one or both of said latch arms may be provided with a toe 12 depending from the pivotal mounting of said arms and adapted to engage the end wall of the offset portion 2 of the bowl.

A casing 13 is provided on the water pipe so as to communicate therewith and is formed with an outlet at 14 to discharge water into the bowl. The casing contains a suitable valve such, for example, as illustrated in Patent No. 1,210,692 granted to me on the second day of January, 1917,—the stem of said valve being shown at 15 projecting above the casing 13.

A lever, in the form of a bail 16 is pivotally mounted on trunnions 17 located at the juncture of the casing 13 with the water pipe, preferably near the lower end of said casing and to the cross bar 18 constituting the connecting member at the lower end of the lever bail, a perforated platform 19 is secured so as to be disposed within the bowl over the depressed bottom thereof, where it will be in position to be easily reached by the nose of the animal. It will be observed that water discharged from the outlet spout 14 will flow between the arms of the lever-bail and is not liable to splash onto the latter.

A saddle 20 embraces the casing 13 and the lower ends of its parallel arms are pivotally connected with the respective side members of the lever bail 16 comparatively short distances from the pivotal mountings of said lever-bail, as indicated at 21. The cross bar 22 of the saddle is provided centrally with a socket 23, into which the upper end of the valve stem 15 enters.

With such construction and arrangement of parts, considerable leverage will be afforded to open the valve and permit the discharge of water into the bowl, when the animal depresses the platform 19.

By raising the platform approximately to the upper dotted line position shown in Fig. 1, the saddle will be lifted off the valve stem and may be moved forwardly or rearwardly as indicated by the dotted line positions. When the saddle has been lowered the lever may be lowered, and the platform caused to descend and rest on the bottom of the bowl as indicated by the lower dotted line position in Fig. 1. The controlling mechanism may be thus uncoupled and rendered inoperable by the animal and when the bowl is dropped, the lever bail will also descend and be protected from being broken off by the animal.

Various changes might be made in the details of construction of my invention without departing from the spirit thereof or limiting its scope, and hence I do not wish to restrict myself to the precise details herein set forth.

Having fully described my invention what I claim as new and desire to secure by Letters-Patent, is:—

1. In a watering device for cattle, the combination with a bowl and water supply means over the bowl provided with a valve, of a pivotal lever provided with a platform disposed within the bowl, and a saddle pivoted to said lever exteriorly of the bowl and engaging the stem of the valve.

2. In a watering device for cattle, the combination with a bowl, and water supply means having a discharge outlet over the bowl and provided with a valve, of a bail forming a pivoted lever having its side members disposed at respective sides of the path of water flowing from said discharge outlet, and having a cross bar connecting said side members and a platform secured to the cross bar of said bail and disposed within the bowl and a saddle pivotally connected with said bail outside of the bowl and extending over the water supply means in position to engage the stem of the valve therein.

3. In a watering device for cattle, the combination with a bowl, and a water supply means having a discharge outlet over said bowl and provided with a valve having an upwardly projecting stem, of a lever-bail pivoted above the bowl, a platform secured to said lever-bail and disposed within the bowl, and a saddle embracing said water supply means and pivoted to the lever-bail, the cross-bar of said saddle disposed over said water supply means and adapted to engage the valve stem.

4. The combination with a hinged bowl, means for retaining it in normal position, a valve casing having a discharge outlet over the bowl, and a valve stem projecting above said casing, of a pivoted lever bail, a platform secured to said lever-bail and disposed within the bowl, and a saddle embracing the valve casing and removably engaging the valve stem, the upright members of said saddle pivoted to the lever-bail.

5. In a watering device for cattle, the combination with a water pipe and a valved discharging means communicating therewith, of a bowl hinged to said pipe under the valved discharging means, a lug projecting laterally from said water pipe, and a latch hinged to the hinged side of the bowl in position to ride over and automatically latch on said lug when the bowl is raised to normal horizontal position.

6. In a watering device for cattle, the combination with a supporting member and a bowl member hinged thereto, of connected latch arms adapted to be disposed at respective sides of one of said members and engaging the other member.

7. In a watering device for cattle, the combination with a support provided with lateral lugs, and a bowl hinged to said support, of connected latch arms hinged to the bowl, said latch arms adapted to be disposed at respective sides of the support and engage the lugs thereon.

8. In a watering device for cattle, the combination with a support and a bowl hinged thereto, of a latch arm hinged within the bowl and provided with a stop toe, and a lug on the support to receive said latch arm.

9. In a watering device for cattle, the combination with a water pipe, a valve casing supported by and communicating with said pipe, a drop bowl into which said valved casing discharges, and means for retaining said drop bowl in normal position, of a lever-bail pivotally supported near the lower end of the valved casing, a platform secured to said lever-bail and disposed within the bowl, and a saddle pivoted to the lever-bail for operating the valve in said valved casing.

10. In a watering device for cattle, the combination with a drop bowl, means for supporting the same in normal position, and valved water supply means having a discharge outlet over the bowl, of a pivoted lever, a platform carried by said lever, and valve operating means connected with said lever and removable out of the path of movement of the valve stem of said valved water supply means, whereby the lever may be dropped when the bowl is in dropped position.

11. In a watering device for cattle, the combination with a bowl, and valved water supply means having a discharge outlet over said bowl, of a pivoted lever, a platform secured to said lever and disposed within the bowl, a saddle pivoted to said lever and normally resting upon the valve stem of the valved water supply means and holding the platform in an approximately horizontal position within the bowl, said saddle being removable from the valve stem, whereby said saddle may be shifted and the platform dropped to render the valve inoperable by the animal.

In testimony whereof, I have signed this specification in the presence of two subscribing witnesses.

HUGO C. RASSMANN.

Witnesses:
H. R. VETTER,
E. J. LAWRENCE.

Copies of this patent may be obtained for five cents each, by addressing the "Commissioner of Patents, Washington, D. C."